United States Patent
Sato

(10) Patent No.: US 10,053,026 B2
(45) Date of Patent: Aug. 21, 2018

(54) INTERIOR COMPONENT

(71) Applicant: TOYODA GOSEI CO., LTD., Kiyosu-shi, Aichi-ken (JP)

(72) Inventor: Ayaka Sato, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 283 days.

(21) Appl. No.: 15/008,576

(22) Filed: Jan. 28, 2016

(65) Prior Publication Data

US 2016/0229338 A1 Aug. 11, 2016

(30) Foreign Application Priority Data

Feb. 5, 2015 (JP) .................. 2015-020901

(51) Int. Cl.
*B60Q 3/54* (2017.01)
*B60R 13/02* (2006.01)
*B60Q 3/64* (2017.01)

(52) U.S. Cl.
CPC .............. *B60R 13/02* (2013.01); *B60Q 3/54* (2017.02); *B60Q 3/64* (2017.02); *B60Q 2500/10* (2013.01)

(58) Field of Classification Search
CPC ... B60Q 3/10; B60Q 3/14; B60Q 3/20; B60Q 3/217; B60Q 3/54; B60Q 3/06; B60Q 3/745
See application file for complete search history.

(56) References Cited

U.S. PATENT DOCUMENTS

| 8,016,465 B2 * | 9/2011 | Egerer | B60R 13/02 362/23.01 |
| 2005/0136768 A1 * | 6/2005 | Huang | A43B 1/0036 442/301 |
| 2010/0214795 A1 * | 8/2010 | Salter | B60Q 3/54 362/488 |
| 2014/0376241 A1 | 12/2014 | Hayashi et al. | |
| 2015/0197186 A1 * | 7/2015 | Salter | B60Q 3/68 362/510 |
| 2015/0274066 A1 * | 10/2015 | Del Pozo Gonzalez | B60R 13/02 362/551 |

FOREIGN PATENT DOCUMENTS

| JP | 62-104737 A | 5/1987 |
| JP | 3069803 A | 4/2000 |
| JP | 2007-196706 A | 8/2007 |
| JP | 2009-101840 A | 5/2009 |
| JP | 2015-003662 A | 1/2015 |
| JP | 2015-003663 A | 1/2015 |

OTHER PUBLICATIONS

Office Action dated Jan. 9, 2018 issued in corresponding JP patent application No. 2015-020901 (and English translation thereof).

* cited by examiner

*Primary Examiner* — Julie Bannan
(74) *Attorney, Agent, or Firm* — Posz Law Group, PLC

(57) ABSTRACT

An interior component includes a transparent base, a covering applied to an outer surface of the base, and a light emitting unit that is located at an inner side of the base and emits light to an inner surface of the base. The covering is a knitted fabric formed by knitting an outer yarn, which has a dark color, and an inner yarn, which has a brighter color than the outer yarn.

5 Claims, 4 Drawing Sheets

INTERIOR COMPONENT

BACKGROUND ART

The present invention relates to an interior component in which a covering is applied to an outer surface of a base.

A vehicle includes interior components such as an instrument panel and a door trim (for example, refer to Japanese Laid-Open Patent Publication No. 2009-101840).

The door trim of the vehicle described in Japanese Laid-Open Patent Publication No. 2009-101840 includes a trim body and a light emission unit, which is located between the trim body and a vehicle body panel and which emits light from the inner side of the trim body. The trim body includes a transparent core and a covering, which is applied to the outer surface of the core. The covering of the trim body is formed by layers having different patterns. When the light emitting unit is deactivated, only the pattern on the outer surface of the covering appears on the outer surface of the trim. When the light emitting unit is activated, the pattern on the outer surface of the covering and the pattern on the inner surface of the covering appear on the outer surface of the trim. That is, the pattern that appears on the outer surface of the trim is the combination of the patterns on the outer and inner surfaces of the covering.

In the interior component described in the publication, light is emitted from the light emission unit to the covering. This brightly illuminates the covering. However, if the light emission unit emits white light, the difference in the visible color of the covering is small between when the light emission unit is activated and when the light emission unit is deactivated. In this case, it is difficult to effectively produce a visual effect with the interior component.

Accordingly, it is an object of the present invention to provide an interior component that effectively produces a visual effect.

To achieve the above object, one aspect of the present invention provides an interior component including a transparent base, a covering, and a light emitting unit. The base includes an outer surface and an inner surface. The covering is applied to the outer surface of the base. The light emitting unit is located at an inner side of the base. The light emitting unit emits light to the inner surface of the base. The covering is a knitted fabric formed by knitting an outer yarn, which has a dark color, and an inner yarn, which has a brighter color than the outer yarn.

In the above structure, the dark color of the outer yarn is viewed as the color of the outer surface of the covering when the light emitting unit is deactivated. When the light emitting unit is activated during the nighttime or in a dark location, the light emitted from the light emitting unit brightly illuminates the covering. In this case, the light emitted from the light emitting unit is transmitted through the base. Further, the light is transmitted through gaps between the outer yarn and the inner yarn while being reflected by the inner yarn, which has a bright color, of the covering. The light transmitted through the covering is viewed as the color of the outer surface of the covering. Accordingly, even if the light emitting unit emits white light, the color of the light transmitted through the covering can be converted to another bright color that is difficult to expect from the color of the outer surface of the covering, that is, from the dark color of the outer yarn. Thus, a visual effect is effectively produced.

EMBODIMENTS OF THE INVENTION

First Embodiment

A first embodiment of an interior component applied to a dashboard of a vehicle will now be described with reference to FIGS. 1 to 5.

Figure 1:
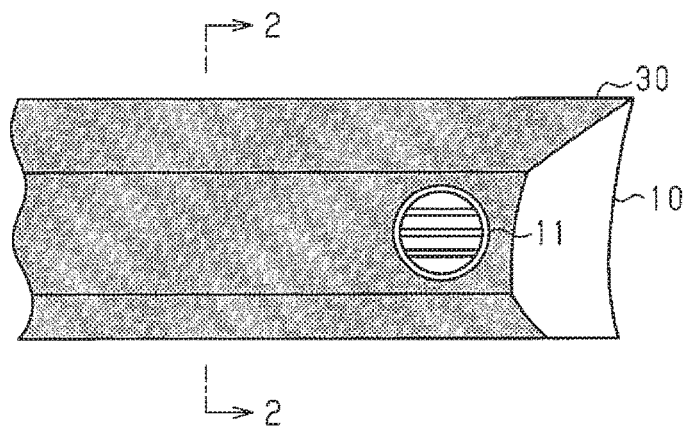
FIG. 1 is a front view showing a first embodiment of an interior component in a non-illuminated state.

As shown in FIG. 1, a dashboard 10 includes an air conditioner outlet 11. The surface of the dashboard 10 functions as a portion of the interior of the vehicle. The surface of the dashboard 10 is changeable in color at nighttime or in a dark location. The surface of the dashboard 10 is covered by a covering 30, which is formed by a knitted fabric.

Figure 2:
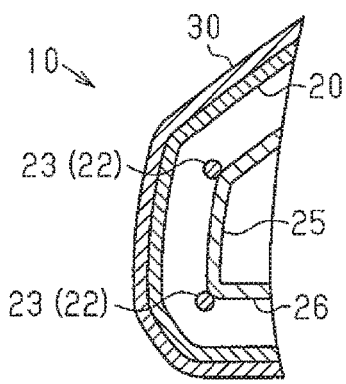
FIG. 2 is a cross-sectional view of the interior component taken along line 2-2 in FIG. 1.

As shown in FIG. 2, the dashboard 10 includes a transparent resin base 20, the covering 30, which is applied to the outer surface of the resin base 20, and light emitting units 22, which are located at the inner side of the resin base 20 and which emit light to the inner surface of the resin base 20. The inner side of the resin base 20 further includes a coupling panel 25, which is shaped in correspondence with the resin base 20. A void extends between the resin base 20 and the coupling panel 25. A reflective material 26 is applied to the outer surface of the coupling panel 25.

Figure 3:
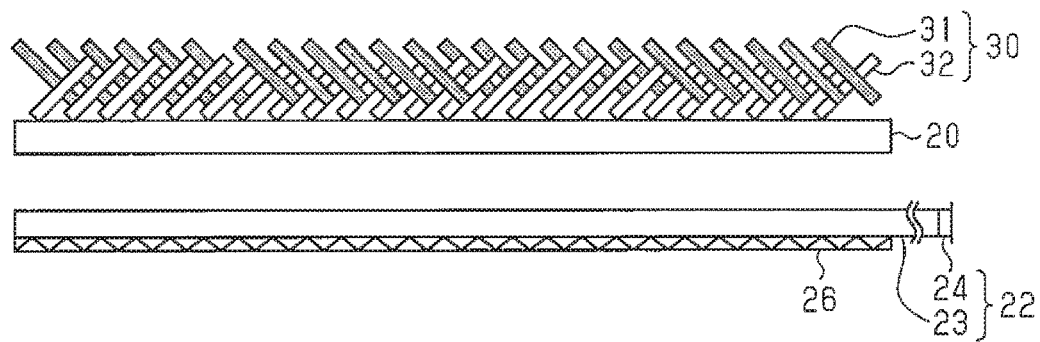
FIG. 3 is a schematic diagram showing the structure of the interior component of FIG. 1.

As shown in FIGS. 2 and 3, each light emitting unit 22 includes a rod-shaped light guide 23 and a light source 24. The two light guides 23 extend in the longitudinal direction of the dashboard 10 on the coupling panel 25. More specifically, in the present embodiment, two light emitting units 22 are arranged on the coupling panel 25. The light source 24 is formed by an LED or the like and arranged on one end of the light guide 23. A light source 24 may be arranged on each of the two ends of the light guide 23. Internal reflection occurs in the light guide 23 so that the light entering the light guide 23 from the light source 24 is guided from one end to the other end. It is preferred that a diffusion agent be applied to the outer surface of the light guide 23 to increase the diffusion of light. The light emitting unit 22 switches the corresponding light source 24 between an activated state and a deactivated state. The light source 24 (LED) preferably emits white light, which has a wide wavelength range and is perceived to be bright. Further, a white light source includes light having a short wavelength such as blue light. This easily excites an inner yarn 32, which has a fluorescent color, and improves a wavelength conversion effect.

Referring to FIG. 3, the knitted fabric of the covering 30 is formed by knitting an outer yarn 31 and an inner yarn 32, which have different colors. The outer yarn 31 has a dark color. The inner yarn 32 has a brighter color than the outer yarn 31. In the present embodiment, a dark color refers to a color having a low lightness and a low chroma, and a bright color refers to a color having a high lightness and a high chrome. Thus, the inner yarn 32 has a higher lightness and a higher chroma than the outer yarn 31. Here, high and low lightness and chroma are defined in accordance with the color system categorized under the Munsell color system or the Practical Color Co-ordinate System (PCCS). The outer yarn 31 is exposed from the outer surface of the covering 30. Thus, the outer surface of the covering 30 has substantially the same color as the outer yarn 31. The inner yarn 32 is exposed from the inner surface of the covering 30. Thus, the inner surface of the covering 30 has substantially the same color as the inner yarn 32. It is preferred that the outer yarn 31 be thicker than the inner yarn 32 so that the inner yarn 32 can be hidden. It is preferred that the inner yarn 32 be finer than the outer yarn 31 so that fine knitting can be performed to form fine stitches. This prevents light from being transmitted through the stitches of the inner yarn 32 without being emitted to the inner yarn 32. Further, the ratio of the inner yarn 32 located in the stitches of the outer yarn 31 may be increased so that the light emitted to the inner yarn 32 is radiated from the stitches of the outer yarn 31. The covering 30 is a single-layer knitted fabric of which outer surface and inner surface are colored differently. If a covering includes layers having different colors, when attaching the covering to the resin base, there would be a need to correctly position and attach the layers a number of times. However, since the covering 30 is formed of a single layer, layers are not displaced, and the covering 30 can be attached to the resin base 20 through a single task.

The outer yarn 31 of the covering 30 has a low-lightness and achromatic color or a low-lightness and low-chroma color such as deep black, deep blue, dark brown, or deep gray. The inner yarn 32 of the covering 30 has a fluorescent color having an intermediate lightness and a high chroma such as yellow green, orange, or pink. In this manner, when using a yarn having a fluorescent color as the inner yarn 32, light transmitted through the covering 30 produces a fluorescent effect that illuminates the inner yarn 32. Thus, the inner yarn 32 emits light so that the color of the inner surface of the covering 30 appears on the outer surface of the covering 30. When the light source 24 emits white light, the inner yarn 32, which has a fluorescent color, strongly reflects light in the wavelength band near the fluorescent color, and the outer yarn 31, which has a dark color, absorbs light of other color tones. This produces a further vivid fluorescent color.

When the light emitting units 22 are deactivated, the color of the outer yarn 31 in the covering 30 is visible during both daytime and nighttime. When the light source 24 of each light emitting unit 22 is activated to illuminate the corresponding light guide 23, the light emitted from the light guide 23 causes the color of the inner yarn 32 in the covering 30 to appear on the outer surface of the covering 30. Thus, when the light emitting units 22 are activated during the nighttime or in a dark location, the color of the inner yarn 32 in the covering 30 is visible.

The operation of the interior component will now be described.

Referring to FIG. 1, when the light emitting units 22 are deactivated, the color of the outer yarn 31 exposed from the outer surface of the covering 30 is visible as the color of the dashboard 10.

Figure 4:
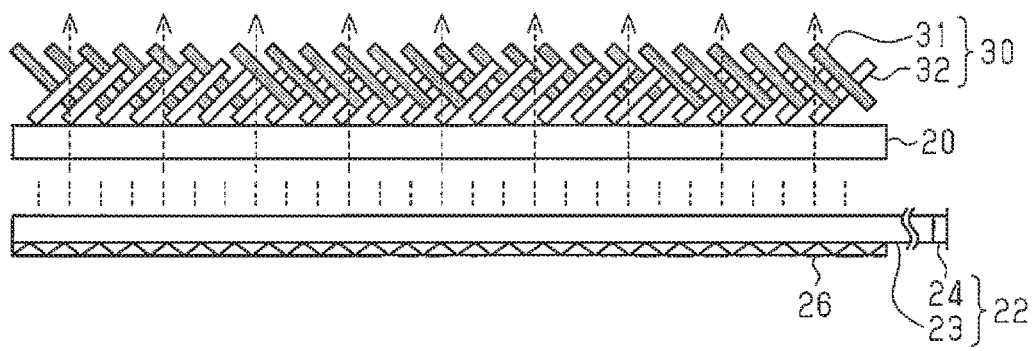
FIG. 4 is a schematic diagram showing the interior component of FIG. 1 in an illuminated state.
Figure 5:
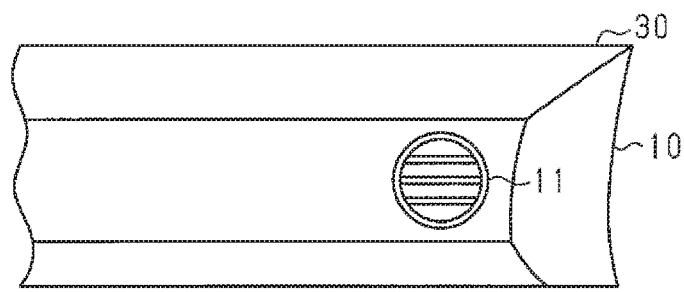
FIG. 5 is a front view showing the interior component of FIG. 1 in an illuminated state.

Referring to FIG. 5, activation of the light emitting units 22 during the nighttime or in a dark location changes the color of the dashboard 10 to a color that differs from the color of the dashboard 10 when the light emitting units 22 are deactivated. Thus, the color of the inner yarn 32 exposed from the inner surface of the covering 30 becomes visible. Referring to FIG. 4, this is because the light emitted from the light emitting units 22 is transmitted through the outer surface of the covering 30, and the color of the inner surface of the covering 30 appears on the outer surface of the covering 30. Further, the inner yarn 32 of the covering 30 has a fluorescent color, and the fluorescent effect causes the color of the inner yarn 32 to appear on the covering 30.

In the dashboard 10, the light emitting units 22 are switched between a deactivated state and an activated state. The color of the outer surface of the covering 30, or the color of the outer yarn 31, is visible when the light emitting units 22 are deactivated. The color of the inner surface of the covering 30, or the color of the inner yarn 32, appears on the outer surface of the covering 30 and becomes visible when the light emitting units 22 are activated during the nighttime or in a dark location. Thus, a visual effect can be effectively produced with light.

The present embodiment has the advantages described below.

(1) The dark color of the outer yarn 31 is visible as the color of the outer surface of the covering 30 when the light emitting units 22 are deactivated. When the light emitting units 22 are activated during the nighttime or in a dark location, the light emitted from the light emitting units 22 brightly illuminates the covering 30. In this case, the light emitted from the light emitting units 22 is transmitted through the resin base 20. Further, the light is transmitted through gaps between the outer yarn 31 and the inner yarn 32 while being reflected by the inner yarn 32, which has a bright color, of the covering 30. The light transmitted through the covering 30, which includes the brightly colored inner yarn 32, is viewed as the color of the covering 30. Accordingly, even when the light emitting units 22 emit white light, the color of the light transmitted through the covering 30 may be converted to a color that is difficult to expect from the color of the outer surface of the covering 30, that is, the dark color of the outer yarn 31. Thus, a visual effect can be effectively produced.

(2) Activation of the light emitting units 22 during the nighttime or in a dark location transmits the light from the light emitting units 22 through the covering 30, and a light storage effect illuminates the inner yarn 32 of the covering 30. This further brightly illuminates the covering 30 and allows the color of the inner surface of the covering 30 to be further visible. Thus, a visual effect can be further effectively produced.

Second Embodiment

A second embodiment of an interior component applied to a dashboard of a vehicle will now be described with reference to FIGS. 6 to 8. The interior component of this embodiment differs from that of the first embodiment in that a pattern is added to the inner surface of the covering 30. The following description will focus on the differences from the first embodiment.

Figure 6:
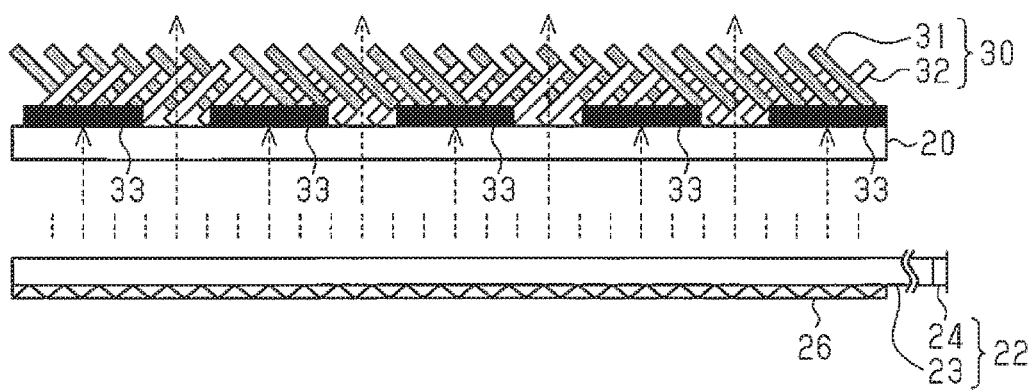
FIG. 6 is a schematic diagram showing a second embodiment of an interior component in an illuminated state.
Figure 7:
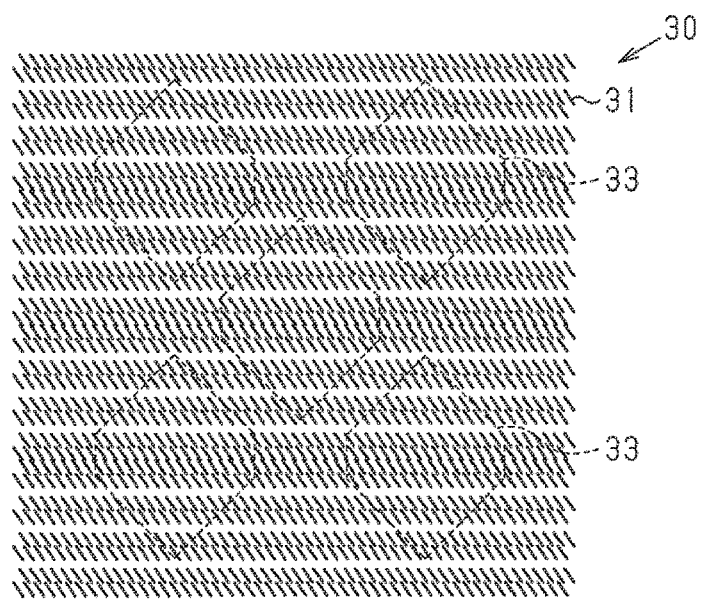
FIG. 7 is a schematic plan view showing a covering for the interior component of FIG. 6.

Referring to FIG. 6, in the second embodiment, a pattern 33 is printed on the inner surface of the covering 30 with, for example, pigment ink. The covering 30 has the same structure as the first embodiment. The pattern 33 has a darker color than the inner yarn 32 of the covering 30. The ink of the pattern 33 is applied to only the inner surface of the covering 30 and does not reach the outer surface of the covering 30. As schematically shown in FIG. 7, the pattern 33 includes a predetermined array of rhombuses. When the covering 30 is viewed from the outer side, the pattern 33 is barely noticeable, and only the color of the outer surface of the covering 30, that is, the color of the outer yarn 31, is visible.

The operation of the interior component will now be described.

Referring to FIG. 1, in the same manner as the first embodiment, when the light emitting units 22 are deactivated, the color of the outer surface of the covering 30, that is, the color of the outer yarn 31, is viewed as the color of the dashboard 10.

Figure 8:
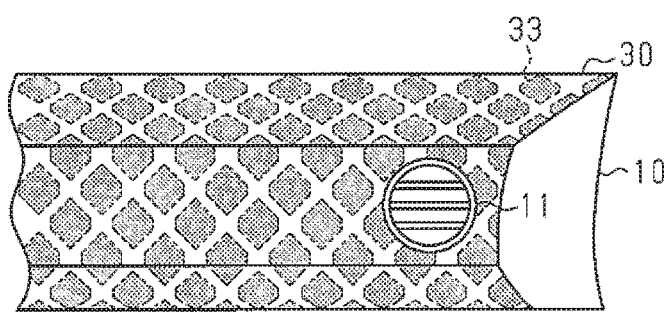
FIG. 8 is a front view showing the interior component of FIG. 6 in an illuminated state.

Referring to FIG. 8, activation of the light emitting units 22 during the nighttime or in a dark location changes the color of the dashboard 10 to a color that differs from the color of the dashboard 10 when the light emitting units 22 are deactivated. Further, the pattern 33, which is printed on the inner surface of the covering 30, becomes visible. Referring to FIG. 6, this is because the pattern 33 blocks the light from the light emitting units 22 so that the light cannot be transmitted through the covering 30. The shades of the pattern 33 appear on the outer surface of the covering 30 at corresponding portions. Further, the color of the inner surface of the covering 30 appears on the outer surface of the covering 30 due to the transmitted light at portions on the outer surface of the covering 30 that do not correspond to the pattern 33. In this manner, when the light emitting units 22 are activated, the color corresponding to the pattern 33 appears on the covering 30.

In the dashboard 10, by switching the light emitting units 22 between deactivated and activated states, different colors appear and become visible. Further, the transmission of light through the covering 30 allows for the appearance of a color corresponding to the pattern 33.

In addition to advantages (1) and (2) of the first embodiment, the present embodiment has the advantage described below.

(3) When the light emitting units 22 are activated during the nighttime or in a dark location, the pattern 33 on the inner surface of the covering 30 easily absorbs light and blocks the transmission of light. Thus, portions on the outer surface of the covering 30 that do not correspond to the pattern 33 are illuminated more brightly than portions on the outer surface of the covering 30 that correspond to the pattern 33. This forms dark and bright locations on the outer surface of the covering 30. Accordingly, a visual effect can be further effectively produced.

The above embodiments may be modified as described below.

Figure 9:
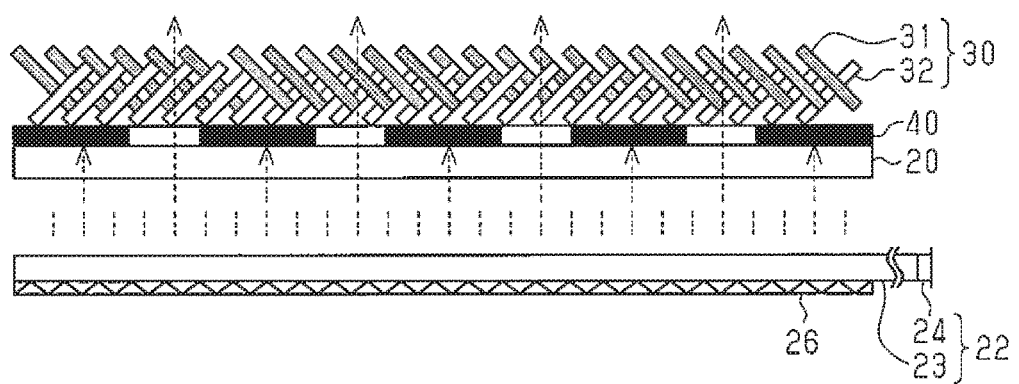
FIG. 9 is a schematic diagram showing a modified example of an interior component in an illuminated state.

In the second embodiment, the pattern 33 is formed on the inner surface of the covering 30. However, a sheet on which a pattern is illustrated may be applied to at least one of the outer surface and inner surface of the covering 30. For example, as shown in FIG. 9, instead of the pattern 33 printed on the inner surface of the covering 30, the pattern 33 may be illustrated on a sheet 40 with a darker color than the inner yarn 32, and the sheet 40 may be applied to the inner surface of the covering 30. This obtains the same advantages as when the pattern 33 is printed on the inner surface of the covering 30. Further, the sheet 40, which includes the pattern 33, can be replaced to easily change patterns.

A colored sheet may be used as the sheet 40 that includes the pattern 33. In this case, the sheet 40 may function as a color conversion sheet so that a color obtained by combining the color of the inner surface of the covering 30 and the color of the sheet 40 appears on the outer surface of the covering 30.

Figure 10:
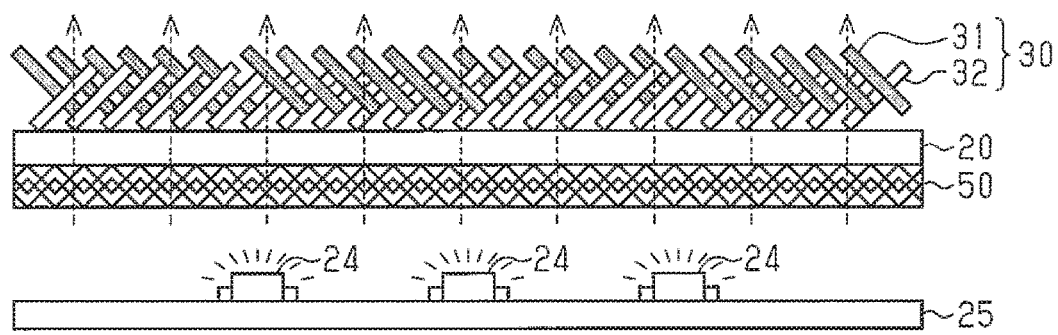
FIG. 10 is a schematic diagram showing another modified example of an interior component in an illuminated state.

In each of the above embodiments, each light emitting unit 22 includes the light source 24 and the light guide 23. However, as shown in FIG. 10, the light emitting unit 22 may be formed by arranging a plurality of light sources 24, such as LEDs, next to one another. This allows the activation and deactivation of the light sources 24 to be finely controlled at different locations. Further, the light sources 24 may emit different colors of light.

When the light sources 24 are arranged as shown in FIG. 10, it is preferred that a diffusion member 50 be arranged between the resin base 20 and the light sources 24 to diffuse the light emitted from the light sources 24. In this structure, the diffusion member 50 diffuses the light emitted from the light emitting units 22. This allows the light emitted from the light emitting units 22 to be diffused over a wider range when transmitted through the covering 30 toward the outer side. When a sufficient amount of light can be obtained with the light sources 24, the diffusion member 50 can be omitted.

In each of the above embodiments, a fluorescent color having a light storage effect may be used as the color of the inner yarn 32. Such an inner yarn 32 may be obtained by dying the inner yarn 32 with a die or pigment having a light storage property.

Figure 11:
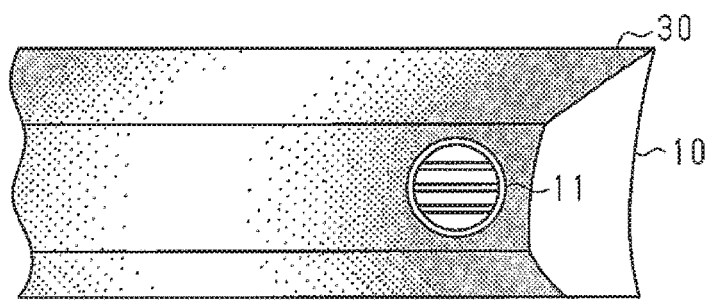
FIG. 11 is a schematic diagram showing a further modified example of an interior component in an illuminated state.

In each of the above embodiments, the light emitting units 22 are all activated or deactivated at the same time. Instead, the light emitting units 22 may be activated so that light appears to flow. For example, when each light emitting unit 22 includes the light guide 23, a light source located at one end of the light guide 23 may be intermittently activated to interrupt the light passing through the light guide 23 and illuminate the light emitting unit 22 as if light appear to flow. When only the light sources 24 are included in each light emitting unit 22, the light sources 24 can be sequentially activated and deactivated to illuminate the light emitting unit 22 so that light appears to flow. During a series of stages in which light appears to flow in such a manner, FIG. 11 shows the stage when the light emitted from the light emitting units 22 only appears at a laterally middle portion of the dashboard 10. In this stage, the color of the inner surface of the covering 30 appears only at the middle portion of the dashboard 10. FIG. 11 shows the dashboard 10 of the first embodiment with the light emitting units 22 activated so that light, appears to flow. In the same manner, the light emitting units 22 of the second embodiment may be activated so that light appears to flow. When the inner yarn 32 has a fluorescent color having a light storage effect, the light storage effect obtains a persistence effect so that the gradation in the amount of light produces light that appears to move smoothly.

In each of the above embodiments, the reflective material 26 is arranged on the outer surface of the coupling panel 25. However, when a sufficient amount of light can be obtained with the light emitting units 22, the reflective material 26 may be omitted.

In each of the above embodiments, the inner yarn 32 has a fluorescent color but does not need to have a fluorescent color.

In each of the above embodiments, instead of the resin base 20, a transparent base formed from a material such as glass may be used.

In each of the above embodiments, the interior component is embodied in the vehicle dashboard 10. Instead of the dashboard 10, the interior component may be embodied in a center console or an instrument panel of a vehicle. When the interior component is embodied in a lower portion of an instrument panel, the interior component may be used to illuminate the legroom and increase visibility in the legroom.

The interior component may be embodied in a side console or door trim of a vehicle. In this manner, the application of the interior component to a side portion of the vehicle increases the brightness of the entire passenger compartment and improves comfort in this space.

The interior component may be embodied as inner upholstery for a console box, an accessory box, a door trim box, or a cup holder that are installed in a vehicle. In such a manner, the application of the interior component to the inner upholstery emphasizes the silhouette of the accommodated item when the light emitting unit is activated. This allows the accommodated item to be easily distinguished and the ornamentality to be improved. Further, the outer surface is formed by a knitted fabric. Thus, an impact absorption effect may be obtained.

The interior component does not have to be used in a vehicle and may be used in housings.

The invention claimed is:

1. An interior component comprising:
   a transparent base including an outer surface and an inner surface;
   a covering applied to the outer surface of the base; and
   a light emitting unit located at an inner side of the base, wherein the light emitting unit emits light to the inner surface of the base;
   wherein the covering is a knitted fabric formed by knitting an outer yarn, which has a dark color, and an inner yarn, which has a brighter color than the outer yarn, wherein
   the covering includes
   an outer surface from which the outer yarn is exposed to have substantially the same color as the outer yarn; and
   an inner surface from which the inner yarn is exposed to have substantially the same color as the inner yarn,
   the outer yarn is thicker than the inner yarn, and
   the light emitting unit emits white light.

2. The interior component according to claim 1, wherein the color of the inner yarn is a fluorescent color.

3. The interior component according to claim 1, wherein the inner surface of the covering includes a pattern having a color that is darker than the color of the inner yarn.

4. The interior component according to claim 1, further comprising a sheet applied to at least one of the outer surface and the inner surface of the base, wherein a pattern having a color that is darker than the color of the inner yarn is illustrated on the sheet.

5. The interior component according to claim 1, further comprising a diffusion member located between the base and the light emitting unit, wherein the diffusion member diffuses the light emitted from the light emitting unit.

* * * * *